US008714049B2

(12) United States Patent
Ast et al.

(10) Patent No.: US 8,714,049 B2
(45) Date of Patent: May 6, 2014

(54) ADJUSTABLE CONTROL SYSTEM

(75) Inventors: Bradley A. Ast, Garden Plain, KS (US); Lance A. Taylor, Wichita, KS (US); Ryan L. Swenson, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/155,526

(22) Filed: Jun. 8, 2011

(65) Prior Publication Data

US 2012/0204672 A1 Aug. 16, 2012

Related U.S. Application Data

(60) Provisional application No. 61/463,060, filed on Feb. 11, 2011.

(51) Int. Cl.

| | |
|---|---|
| ***G05G 1/04*** | (2006.01) |
| ***B60J 9/00*** | (2006.01) |
| ***A47C 7/54*** | (2006.01) |

(52) U.S. Cl.

USPC .......................... 74/522; 296/1.09; 297/411.2

(58) Field of Classification Search

USPC ........ 74/473.1, 473.15, 473.3, 519, 522, 523; 297/411.2, 411.21; 296/1.09, 37.14, 296/37.8

See application file for complete search history.

(56) References Cited

U.S. PATENT DOCUMENTS

| | | | | |
|---|---|---|---|---|
| 4,646,869 | A | 3/1987 | Kerner, Jr. | |
| 4,702,520 | A | 10/1987 | Whisler et al. | |
| 5,566,778 | A | 10/1996 | Valier et al. | |
| 6,148,688 | A | 11/2000 | Nishimaki | |
| 7,014,255 | B2 * | 3/2006 | Amamiya et al. | 296/190.08 |
| 7,275,616 | B2 | 10/2007 | Link et al. | |
| 7,290,635 | B2 | 11/2007 | Bisick et al. | |
| 7,438,318 | B2 | 10/2008 | Sano | |
| 7,458,439 | B2 * | 12/2008 | Catton et al. | 180/334 |
| 7,641,019 | B2 | 1/2010 | Pline | |
| 7,712,571 | B2 | 5/2010 | Proud et al. | |
| 2006/0042857 | A1 * | 3/2006 | Catton et al. | 180/334 |
| 2007/0144133 | A1 * | 6/2007 | Drake et al. | 56/323 |
| 2007/0295551 | A1 * | 12/2007 | Proud et al. | 180/333 |
| 2008/0265646 | A1 * | 10/2008 | Enberg et al. | 297/411.32 |
| 2010/0123345 | A1 * | 5/2010 | Steege et al. | 297/411.2 |

* cited by examiner

*Primary Examiner* — Vicky Johnson
(74) *Attorney, Agent, or Firm* — Sue C. Watson

(57) ABSTRACT

A control system for a work vehicle includes an armrest having a first support and a control grip having a second support. The first support is configured to permit selectable movement of the armrest. The second support is configured to permit selectable movement of the control grip. The armrest and the control grip are independently movable from each other. The first support and the second support are configured to receive a common fastener to secure the first support and the second support to a surface of the work vehicle.

15 Claims, 6 Drawing Sheets

ADJUSTABLE CONTROL SYSTEM

RELATED APPLICATION

This application claims priority to U.S. Provisional Patent Application Ser. No. 61/463,060, filed Feb. 11, 2011, entitled "Adjustable Joystick Control Handle Mounts."

FIELD OF THE INVENTION

The present invention generally relates to control systems and, more particularly, to operator controlled control systems for use with work vehicles, usable to position a suitable implement, such as a bucket, such work vehicles including, but not limited to, a skid steer or wheel loader.

BACKGROUND OF THE INVENTION

Work vehicles, such as a skid steer or wheel loader, are commonly used to load and move substantial volumes of dirt and like material from one location to another. A conventional skid steer includes a generally compact frame that is supported for self-propelled movement over land by pairs of air-filled pneumatic tires and has a bucket or other implement mounted to a front end thereof. The bucket or implement can be selectively elevated to a position above side panels on a skid steer and can be selectively tilted to "dump" materials therefrom.

An operator cab, also typically of compact construction, is supported by the frame. Operator controls, sometimes referred to as a control system, are provided to permit the operator to maintain control of the position of the implement. A commonly used control system includes a pair of opposed arm rests secured to corresponding control grips or "joysticks". Due to the versatility of the work vehicles, economy of operation and other reasons, multiple operators may be required to utilize the same work vehicle during different time periods or work shifts within the same day. Since effective operation of the work vehicle is enhanced when the operator is comfortable, the position of the operator controls should be easily adjustable. In addition, the operator controls, once adjusted, should maintain their position.

Thus, there is a need and a desire for an operator control system that is easily adjustable, and that once the position of the control system has been adjusted, the control system maintains or secures the position of each of the arm rests and control grips.

SUMMARY OF THE INVENTION

The present invention relates to a control system for a work vehicle includes an armrest having a first support and a control grip having a second support. The first support is configured to permit selectable movement of the armrest. The second support is configured to permit selectable movement of the control grip. The armrest and the control grip are independently movable from each other. The first support and the second support are configured to receive a common fastener to secure the first support and the second support to a surface of the work vehicle.

The present invention further relates to a control system for a work vehicle including an armrest having a first support. A control grip has a second support. The control system further includes a base. The first support is configured to permit selectable movement of the armrest, and the second support is configured to permit selectable movement of the control grip. The armrest and the control grip are independently movable from each other. The first support and the second support are configured to receive a common fastener to secure the first support and the second support to a surface of the work vehicle. The base is configured to be secured to the surface of the work vehicle and configured to receive the common fastener associated with the first support and the second support.

An advantage of the present invention is a control system that includes a separately adjustable arm rest and control grip.

A further advantage of the present invention is a control system that is manually adjustable.

It is to be understood that an embodiment may not incorporate all of the identified advantages.

Other features and advantages of the present invention will be apparent from the following more detailed description of the preferred embodiment, taken in conjunction with the accompanying drawings which illustrate, by way of example, the principles of the invention.

Numerous other features and advantages of the present invention will become readily apparent from the following detailed description, the accompanying drawings, and the appended claims.

DETAILED DESCRIPTION OF THE INVENTION

Figure 1:
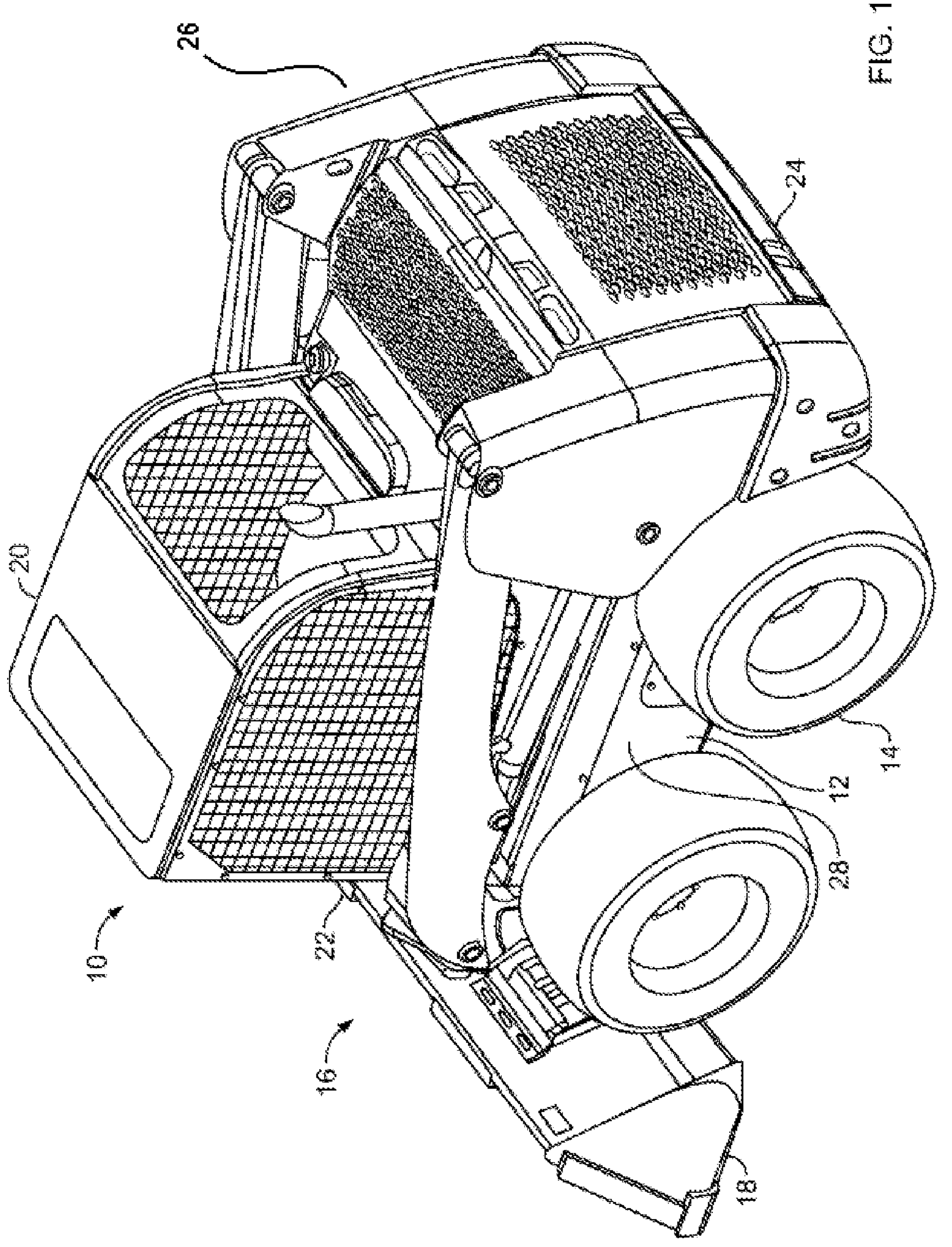
FIG. 1 is an upper perspective view of a work vehicle equipped with an implement shown and embodying the teachings of the present invention.

FIG. 1 shows a work vehicle 10 provided with a frame 12 that rotatably carries a driving device 14, such as a plurality of wheels, although in another embodiment, tracks may be used or activated to selectably move the vehicle. A lifting structure 16 includes an arrangement of structural members and actuators controllable by an operator (not shown) to manipulate an implement 18 to perform work. Frame 12 structurally supports an operator cab 20 or cab to surround and protect the operator, which frame 12 includes a front end 22 facing implement 18 and an opposed back end 24 with ends 22, 24 positioned between opposed lateral sides 26, 28 of the frame.

Figure 2:
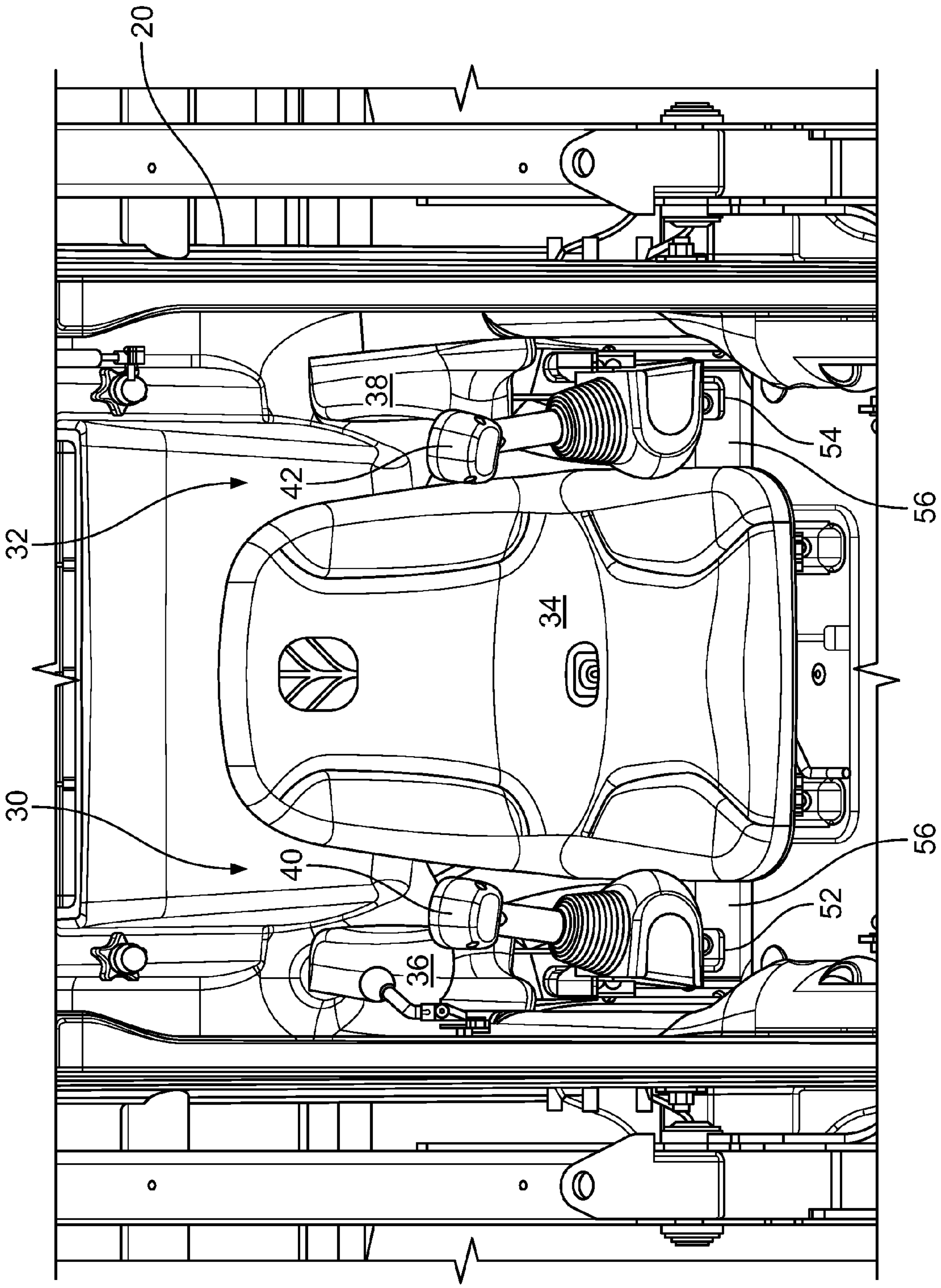
FIGS. 2 and 3 are different views showing an inside of an operator cab and the control system of the present invention.
Figure 3:
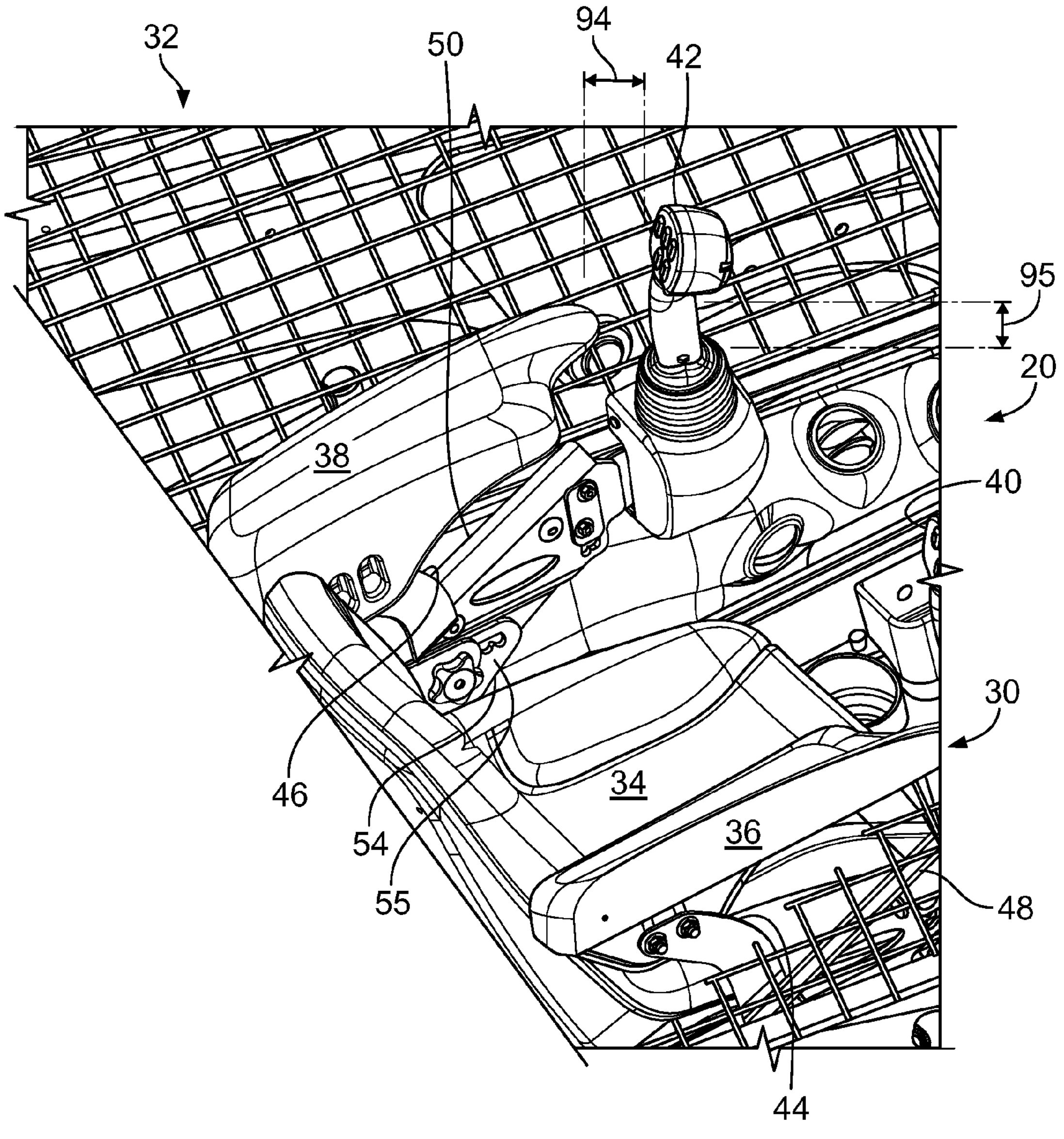

FIGS. 2-3 show different views of cab 20 and associated structure. Cab 20 includes an operator chair 34 positioned between an opposed pair of control systems 30 and 32. For purposes herein, although control systems 30 and 32 may collectively be required to maintain control of the work vehicle, each combination of an armrest and control grip is separately referred to as a control system. Although control systems 30 and 32 are shown as mirror-images of each other, it is to be understood that other arrangements may be used.

Figure 5:
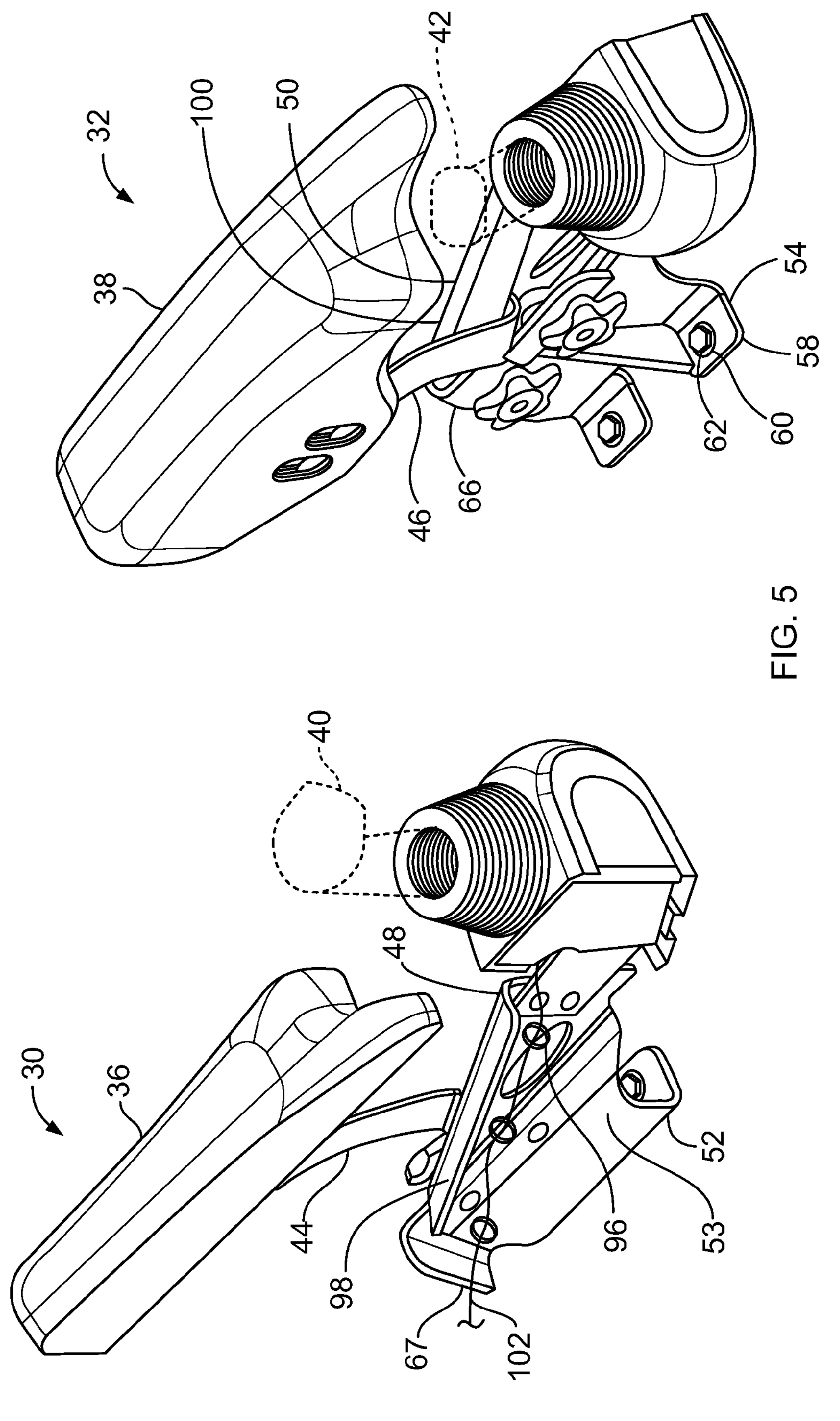
FIG. 5 shows a set of control systems, with control grips shown in phantom lines, of the present invention.

Further referring to FIGS. 2, 3 and 5, control system 30 includes an armrest 36 having a first support 44 that is connected to the armrest at one end and a base 52 (that includes a body 53) at the other end. Base 52 provides structural support for armrest 36 and is secured to a surface 56 within cab 20, such as the floor. In an alternate embodiment, surface 56 could be a wall of the cab. Control system 30 further includes a control grip 40 having a second support 48 that is connected to the control grip at one end and the base 52 at the other end. Base 52 provides structural support for control grip 40 and is secured to a surface 56 within cab 20, such as a floor.

Similarly, control system 32 includes an armrest 38 having a first support 46 that is connected to the armrest at one end and a base 54 (that includes a body 55) at the other end. Base 54 provides structural support for armrest 38 and is secured to a surface 56 within cab 20, such as the floor. In an alternate embodiment, surface 56 could be a wall of the cab. Control system 32 further includes a control grip 42 having a second support 50 that is connected to the control grip at one end and the base 54 at the other end. Base 54 provides structural support for control grip 42 and is secured to a surface 56 within cab 20, such as a floor.

Figure 4B:
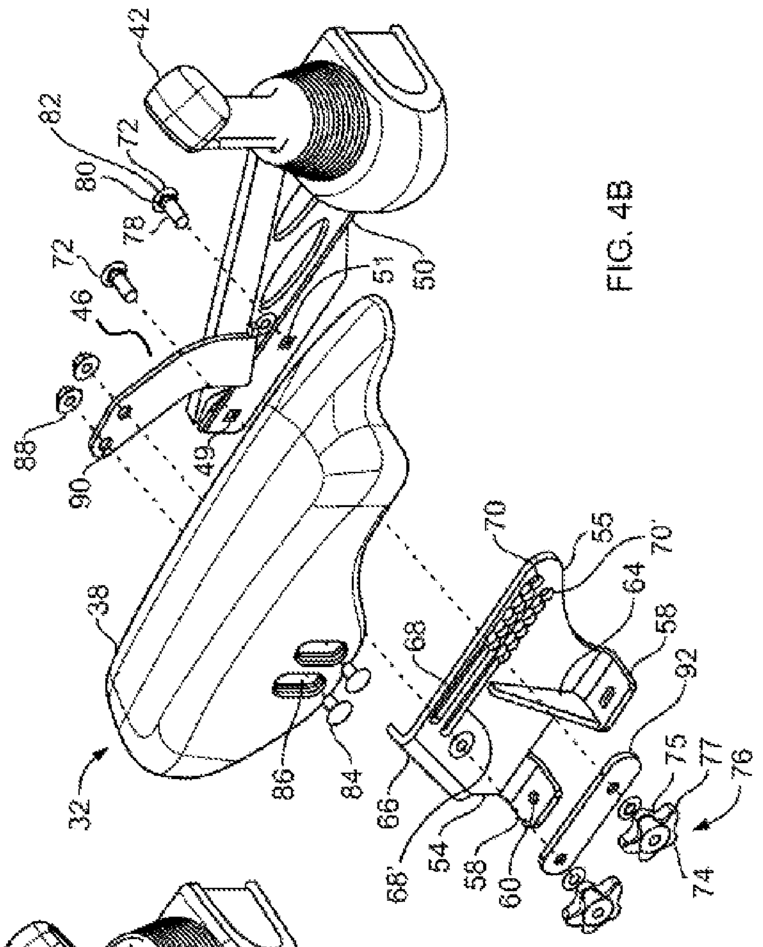
FIGS. 4A, 4B and 4C show an upper perspective view of an assembled control system and two separate exploded views, respectively, of a control system of the present invention.
Figure 4A:
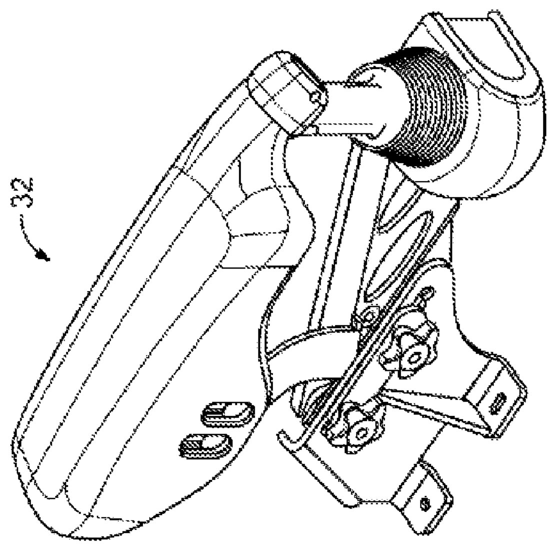
Figure 4C:
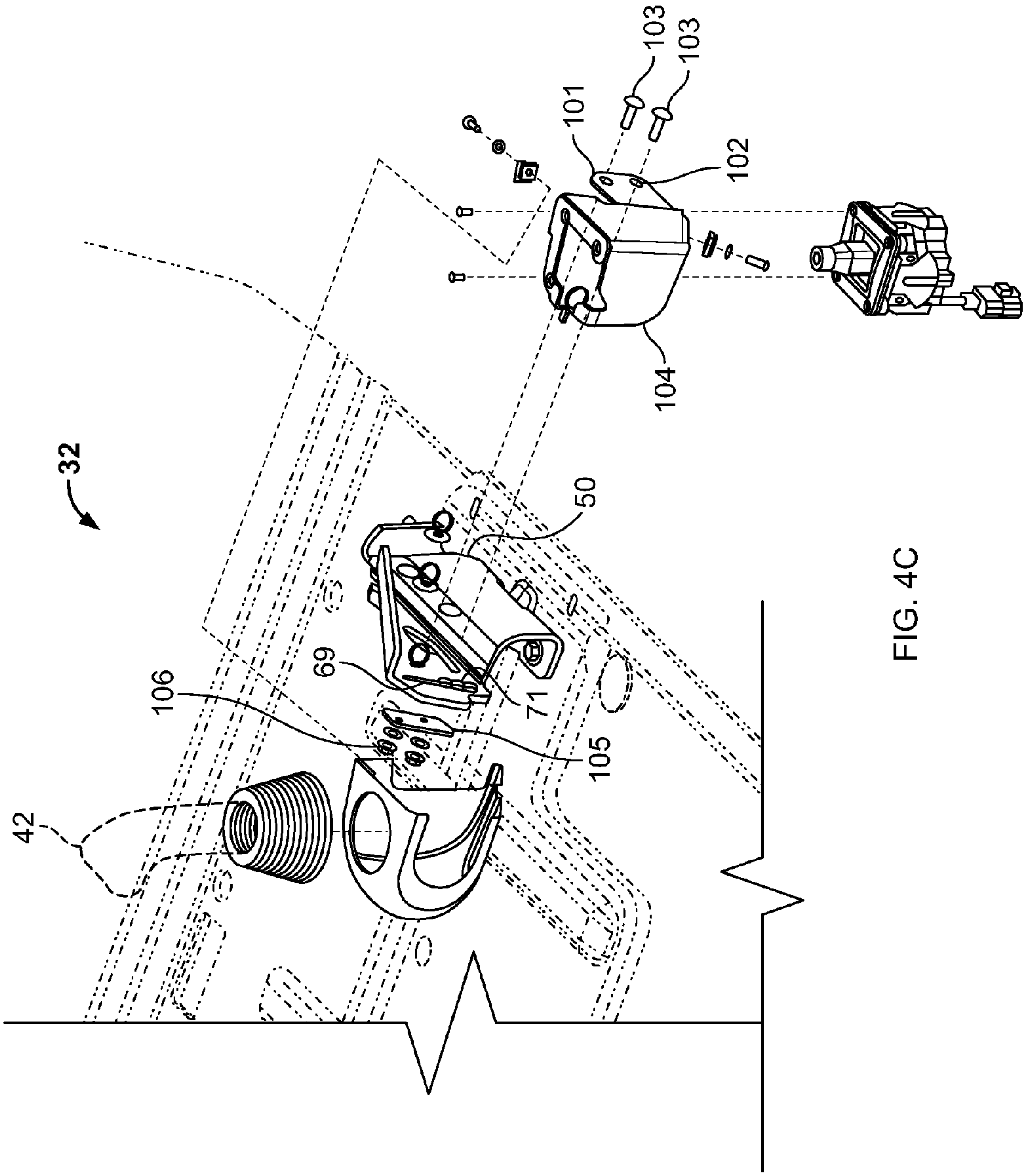

FIGS. 4A, 4B and 4C show an upper perspective view of an assembled control system 32 and two exploded views, respectively, of control system 32. Base 54 of control system 32 includes feet or tabs 58 each having an opening 60 formed therethrough for receiving a fastener 62 to secure the base to a surface 56 (FIG. 2) of the work vehicle, such as the floor of the operator cab. As further shown in FIGS. 4A and 4B, base 54 includes a gusset 64 that is secured to each of body 55 and tab 58, as well as a flange 66 formed in body 55, which both individually and collectively provide enhanced structural stiffness to the base. A slot 68 includes a perforated portion 70 which is configured to receive a fastener 72 such that perforated portion 70 substantially prevents movement of first support 46 and with respect to base 54 with fastener 72, also referred to as a common fastener, while the fastener is partially assembled with the perforated portion. That is, common fastener or fastener 72 is used to secure both first support 46 and second support 50 to base 54, such as a pair of fasteners as further shown in FIGS. 4A and 4B, which fasteners performing this securing function, even when the fasteners are not installed to a predetermined torque, or fully assembled. However, in another embodiment a single common fastener or fastener 72 may be used to secure both the first support 46 and the second support 50 to the base 54, so long as the common fastener extends through the perforated portion 70, the first support 44 and the second support 50. In an alternate embodiment, the base can include multiple sets of slots, such as slots 68 and 68', permitting additional vertical adjustment of control grip 42 and armrest 38, if desired.

FIG. 4C shows an exemplary embodiment for achieving vertical adjustment of control grip 42. Second support 50 includes a slot 69 having a perforated portion 71 formed in second support 50. As further shown in FIG. 4C, slot 69 and perforated portion 71 are vertically positioned, although in an alternate embodiment, both slot 69 and perforated portion 71 could also contain a horizontal component, and thus could result in both lateral and vertical adjustment of control grip 42. Adjustment of control pod 104, which ultimately supports control grip 42, can be achieved by selectably positioning and inserting fastener 103 through an aperture 101 formed in control pod 104 and slot 69, then through stiffener plate 105 and secured by fastener 106. Further, by selectably positioning fastener 103 through an aperture 102 and perforated portion 71, then through stiffener plate 105 and secured by fastener 106, selective vertical movement and positioning of control pod 104 (and control grip 42) may be achieved.

FIGS. 4A and 4B further show first support 46 and second support 50 having aligned apertures 49, 51 to each receive a corresponding fastener 72 therethrough. That is, as shown, upon assembly, aperture 49 and the non-perforated portion of slot 68 receive one fastener 72, while aperture 51 and perforated portion 70 of slot 68 receive the other fastener 72. In other words, adjustment of first support 46 and second support 50 in a fore and aft direction may be achieved by selectably positioning and inserting fasteners 72 with respect to slot 68, with perforated portion 70 of slot 68 securing the relative position of first support 46 and second support 50 with respect to the supports 46, 50. In an alternate embodiment, as previously discussed, additional slot 68' having perforated portion 71 may be formed in base 54, for example in a position that is vertically below slot 68, such that adjustment of first support 46 and second support 50 in a second direction may be achieved by selectably positioning and inserting fasteners 72 between slot 68 and slot 68'. Further, by selectably positioning fasteners 72 both between slot 68 and slot 68', and additionally positioning at least one fastener along different portions of perforated portion 70 and perforated portion 70', bi-directional movement of supports 46, 50 and therefore, bi-directional movement of respective armrest 38 and control grip 42 may be achieved.

As further shown in FIGS. 4A and 4B, common fastener or fastener 72 includes a knob 74 having gripping features 76, such as a plurality of recesses 75 and/or a plurality of protrusions 77. In one embodiment, knob 74 resembles a star, and in a further embodiment, the knob resembles a five-point star. Common fastener or fastener 72 may include a carriage bolt, which typically has a shank portion 78 that extends toward a head 82. A locking feature 80, such as a region of square cross-sectional area, is positioned between shank portion 78 and head 82. During installation or assembly of common fastener or fastener 72, locking feature 80 is configured for insertion into a corresponding opening having a similar shape that is formed in at least one of first support 46, second support 50, and/or slot 68 of base 54.

Upon sufficient insertion of locking feature 80 inside of first support 46, second support 50, and/or slot 68 of base 54, locking feature 80 prevents rotational movement of common fastener or fastener 72 with respect to knob 74, permitting knob 74 to threadedly engage the threaded shank portion 78 of common fastener or fastener 72. In other words, subsequent to insertion of shank portion 78 of common fastener or fastener 72 through first support 46, second support 50, and/or slot 68 of base 54, by virtue of locking feature 80, which prevents common fastener or fastener 72 from rotating relative to rotational movement of knob 74, common fastener or fastener 72 may be manually assembled by rotating knob 74 in one direction. Enabling manual assembly in a region having limited space, such as a cab, greatly simplifies initial assembly and/or adjustability by an operator. In a similar fashion, FIGS. 4A and 4B show a pair of slots 86 formed in armrest 38. Each of a pair of fasteners 84, such as a carriage bolt, extends through a corresponding slot 86, and then through a corresponding aperture 90 formed in first support 46 prior to threaded engagement with a nut 88. Once the fasteners 84 have been inserted through slot 86 and aperture 90, and initial threaded engagement with nut 88, the desired vertical position of the armrest may then be established by sliding slot 86 with respect to fasteners 84, and then sufficiently rotating nut 88 with respect to fastener 84 in one direction to secure the armrest in the desired position. In one embodiment, nut 88 can be a knob, permitting manual adjustment in a manner similar to that previously discussed knob 74.

It is to be understood that slot 68 and slot 86 permit adjustment or selectable movement of each of armrest 38 and control grip 42 in at least two directions.

As further shown FIGS. 4A and 4B, a plate 92 can be inserted between knob 74 and slot 68 of base 54. Plate 92, when assembled between knob 74 and slot 68, enlarges the amount of contact area between knob 74 and slot 68, thereby more evenly distributing the compressive force applied by knob 74 to slot 68, and providing enhanced rigidity between the assembled components.

It is to be understood that in addition to providing a rigid construction to support the armrest and the control grip using the same fastener(s), first support 46 and second support 50 secure the armrest and the control grip at both a spacing 94 (for example, horizontal spacing; see FIG. 3) and a spacing 95 (for example, vertical spacing; see FIG. 3) that is selectably controllable by an operator.

FIG. 5 shows a set of control systems 30, 32, which are mirror images of each other in an exemplary embodiment, although in other embodiments, the control systems may be non-symmetrical. Control systems 30 shows a set of clamping devices 96 configured to secure a cable 102 or wire bundle extending from control grip 40 to a control device (not shown). Flange 67 of base 52 and flange 98 of second support 48 help to shield and otherwise protect the cable 102 from control grip 40 extending through clamping devices 96 by substantially surrounding the cable. Similarly, for control system 32, flange 66 of base 54 and flange 100 of second support 50 help to shield and otherwise protect the cable (not shown) from control grip 40 extending through clamping devices 96 by substantially surrounding the cable extending from control grip 42. In both control systems 30, 32 the clamping device secures the control grip or cable in a direction facing away from the operator of the work vehicle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for a vehicle comprising:

an armrest having a first support;

a control grip having a second support; and a base secured to a surface of the vehicle;

wherein the first and second supports are configured to be positioned with respect to the base by selectively engaging first and second fasteners through apertures defined in at least one of the first support or the second support and a slot defined in the base, wherein the slot includes a perforated portion configured to prevent movement of the first and second support with respect to the base.

2. The control system of claim 1, wherein the armrest defines at least one opening extending in a substantially vertical direction, the armrest being secured to the first support through the at least one opening via a coupling fastener.

3. The control system of claim 2, wherein the armrest is configured to be selectively positioned with respect to the first support by moving the armrest with respect to the coupling fastener in a vertical direction.

4. The control system of claim 1, wherein the armrest and the control grip are independently movable with respect to one another.

5. The control system of claim 1, wherein the first fastener includes a locking feature defined by a first shape formed on the first fastener, wherein either the first support or the second support or the base defines a second shape that cooperatively fits the first shape defined on the first fastener.

6. The control system of claim 5, wherein the locking feature prevents rotational movement of the first fastener when the first shape on the first fastener is engaged with the second shape.

7. A control system for a vehicle comprising:

an armrest having a first support;

a control grip having a second support; and a base secured to a surface of the vehicle;

wherein the first and second supports are configured to be positioned with respect to the base by selectively engaging first and second fasteners through apertures defined in at least one of the first support or the second support and a slot defined in the base, wherein the base defines a second slot.

8. The control system of claim 7, wherein the second slot is defined vertically below the first slot.

9. The control system of claim 7, wherein the first and second fasteners are configured to be inserted into either the first slot or the second slot.

10. A repositionable control system for a vehicle comprising:

a first support engaged with a platform for supporting a user's arm;

a second support engaged with a control device for engaging the user's hand;

a base that engages the first and second support;

wherein the first and second supports are configured to be selectively positionable with respect to the base by first and second fasteners passing through apertures defined in at least one of the first support or the second support and a slot defined in the base; and wherein the slot includes a perforated portion configured to prevent movement of the first and second support with respect to the base.

11. The control system of claim 10, wherein the base defines a second slot.

12. The control system of claim 11, wherein the second slot is defined vertically below the first slot.

13. The control system of claim 10, wherein the platform defines at least one opening located in a vertical direction, the platform being secured to the first support through the at least one opening via a coupling fastener.

14. The control system of claim 13, wherein the platform is configured to be positioned relative to the first support by moving the platform with respect to the coupling fastener in a vertical direction.

15. The control system of claim 10, wherein the platform and the control device are selectively and independently movable with respect to one another.

* * * * *